United States Patent [19]
Coots et al.

[11] 4,275,980
[45] Jun. 30, 1981

[54] APPARATUS FOR AUTOMATICALLY DEGASSING FIGAL CONTAINERS

[75] Inventors: James C. Coots, Marietta; Muir G. Howser, Dunwoody, both of Ga.

[73] Assignee: The Coca-Cola Company, Atlanta, Ga.

[21] Appl. No.: 55,804

[22] Filed: Jul. 9, 1979

[51] Int. Cl.$^3$ .............................................. B65G 65/34

[52] U.S. Cl. .................................... 414/411; 141/165; 141/168; 198/394; 198/482

[58] Field of Search ....................... 414/403, 411, 414; 198/344, 394, 480, 482; 141/165, 168

[56] References Cited

U.S. PATENT DOCUMENTS 3,186,577 6/1965 Tennison ............................. 220/244
3,710,928 1/1973 Van Zijp ......................... 198/482 X

*Primary Examiner*—Robert G. Sheridan

[57] ABSTRACT

An apparatus for automatically degassing a five gallon container commonly known in the beverage industry as a FIGAL is described. In order to open the lid of a FIGAL container it is necessary to first depressurize or degas the container since the lids of these containers open inwardly. The apparatus described herein automatically degasses and opens the containers which are moving substantially continuously along a conveyor. The FIGAL containers moving along a conveyor are sequentially transferred onto a ten station turntable. Associated with the ten station turntable is an indexing mechanism which rotates the containers to the proper orientation to achieve alignment between one of a pair of valves on the top of the container and a degassing socket which engages the valve. By the time the container reaches the ninth station on the turntable, substantially all gas has been removed from the container which permits an automatic opening mechanism to grasp a handle on top of the container and open the container cover. The degassed container is then transferred from the turntable back onto the conveyor on which it was originally travelling.

12 Claims, 12 Drawing Figures

APPARATUS FOR AUTOMATICALLY DEGASSING FIGAL CONTAINERS

BACKGROUND OF THE INVENTION

1. Field of the Invention

The present invention relates to an automatic indexing and degassing apparatus for containers moving along a continuous conveyor. More specifically, the present invention relates to a system which automatically degasses and opens the lid on syrup containers commonly referred in the post-mix beverage industry as FIGAL containers.

FIGAL containers as defined herein include containers similar to that illustrated in U.S. Pat. No. 3,186,577 to Tennison. The word "FIGAL" is an accepted abbreviation in the beverage industry for a syrup container with a five gallon capacity.

2. Description of the Prior Art

FIGAL containers such as that described in U.S. Pat. No. 3,186,577 to Tennison are filled with syrup through an opening in the top of the container closed by a sealable oval shaped lid. After filling these containers with syrup, the contents of the container are pressurized through one of the valves on top of the container by inert gas such as nitrogen. When these containers become empty, preparatory to refilling, they must be degassed in order to open the container lid through which the syrup is to be introduced. This degassing is necessary since the oval shaped lid opens inwardly into the container against the internal pressure of the container. Heretofore, degassing of these containers was performed manually and the container was then opened manually in preparation for cleaning and refilling. Obviously, these manual procedures are very time consuming and there is a need in the art for an apparatus which will automatically degas and open FIGAL containers as they are rapidly transported along a continuous conveyor.

SUMMARY OF THE INVENTION

Accordingly, it is a primary object of the present invention to provide an apparatus which will automatically degas and open FIGAL containers at an increased rate of speed to that possible heretofore.

It is a further object of the present invention to provide an automatic indexing mechanism which properly positions the valves on the top of a FIGAL container in alignment with a degassing mechanism.

It is another object of the present invention to provide a mechanism which automatically opens the lids of the FIGAL containers after said containers have been degassed.

It is still another object of the present invention to provide a pneumatic power and control system for enabling the synchronous operation of all operative components of the automatic degassing and opening system of the present invention.

The objects of the present invention are fulfilled by providing: a continuous conveyor for transporting a plurality of FIGAL containers single-file past a degassing and opening station; means for sensing the entrance of a FIGAL container into the region defined by said station; transfer means for transferring a FIGAL container from the conveyor onto a turntable; clamp means for securing said FIGAL container as it enters the third container station on the turntable and for rotating said container about its vertical axis; latch means for stopping the rotation of said FIGAL container at a position wherein one of the valves on the top of the FIGAL container is in alignment with a reciprocating socket of a degassing mechanism; means for lowering the reciprocating degassing socket into engagement with said valve when rotation of the container ceases; means for opening said valve to degas said container; and means for automatically opening the lid on the top of the container after the container has been degassed. All of the above operations are accomplished by mechanisms used in conjunction with a ten station rotating turntable. The turntable is approximately five feet in diameter and rests on a large diameter horizontal bearing with one bearing race fixed to a rigid subframe which includes gear teeth affixed thereto. The rotating motion is created by a pinion gear which engages the gear teeth of the rigid subframe bearing race of the turntable. Rotation of the pinion gear approximately 90° causes the turntable to index 36° or one position.

Containers are transferred from a continuous conveyor onto the turntable and when they reach the third station of the turntable they are clamped and indexed by the indexing mechanism of the present invention. The clamping and indexing mechanism of the present invention includes four rubber covered vertically oriented rollers disposed in pairs at each of the container stations and one pair of rollers disposed on the opposite side of the third station which includes a drive motor coupled to one or both of the rollers for effecting rotation of the FIGAL container when the container is clamped in contact therewith. The other pair of rollers are not driven but are free to rotate about their axes as idler rollers in response to the rotation of the clamped container. The roller pair including the drive roller is movable transversely of the container axes by a pneumatic piston as a container reaches station three of the turntable. Therefore, as a container enters the third station of the turntable, the drive roller pair moves transversely of the container and presses the container against the idler rollers. The drive motor is then energized and the container begins to rotate. Rotation continues until a latch mechanism engages a discrete opening of a predetermined shape molded into the rubber skirt on the top of the FIGAL container. At this point in time the container stops its rotation and logic then activates the degassing cylinder which lowers the degassing socket onto one of the valves on the top of the container depresses the valve and allows the degassing process to begin before leaving station three. Degassing of the container continues as the container moves through stations four-eight. When the container has reaches container station nine an opening mechanism mounted on an air cylinder supported from a stationary frame is extended and through its action lifts the handle on the top of the container and disengages the container lid. The container then moves onto station ten, logic releases the degassing cylinder and activates a discharge sweep arm which removes the container from the turntable back onto the conveyor on which it was originally travelling.

The apparatus of the present invention is designed to allow a minimum degassing time of twenty seconds per container at a rate of 650 containers per hour. The synchronous operation of the apparatus can be controlled by pneumatic or electric logic and the rate of operation may be adjusted by changing the timing cycles allocated to each function. In a preferred embodiment of the present invention, as will become more fully apparent hereinafter, the power supply and control circuit is purely pneumatic.

BRIEF DESCRIPTION OF THE DRAWINGS

The present invention will become more fully understood by a detailed description given hereinbelow and the accompanying drawings which are given by way of illustration only and thus are not limitative of the present invention and wherein.

DESCRIPTION OF THE PREFERRED EMBODIMENTS

Figure 1:
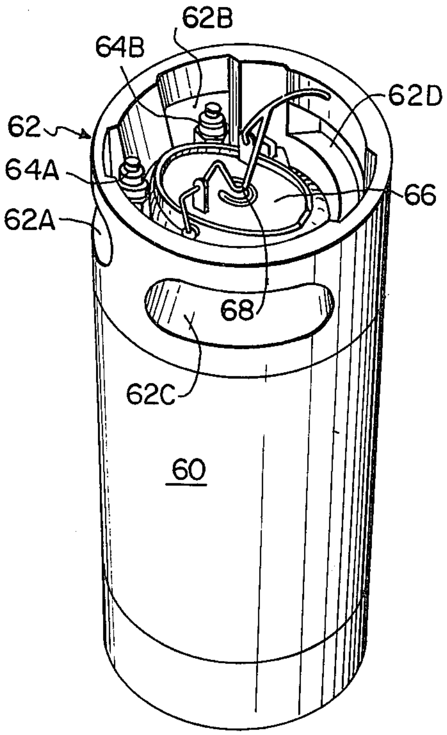
FIG. 1 is a perspective view of a typical FIGAL container to be processed through the automatic degasser station of the present invention.

Referring in detail to FIG. 1, there is illustrated a typical FIGAL container with which the automatic degasser station of the present invention as designed to operate. The container, generally indicated 60, is fabricated of stainless steel or other suitable materials and includes a top rubber protective skirt 62. The skirt 62 has four openings about the periphery thereof, including openings 62A, 62B to give access to valves 64A, 64B disposed on the top of the container and openings 62C and 62D forming handles, so that the container may be manually lifted. The top of the container also includes an oval-shaped closure member 66 which opens inwardly into the container when the handle 68 is raised as shown in FIG. 1.

Two valves 64A and 64B are provided for the pressurization of the syrup in the container 60 with $CO_2$ or nitrogen and for the dispensing of the syrup from the container 60 when it is connected to a post-mix beverage dispenser. It is necessary before the closure member or lid 66 can be opened inwardly into the container 60 by means of the handle 68 that the container 60 be depressurized. The automatic degasser station of the present invention provides a means for automatically depressurizing the container 60 by opening one of the valves 64A, 64B and a means for opening the closure member 66 as a plurality of containers are continually transported around a turntable disposed at the degasser station.

The openings 62C, 62D, as stated hereinbefore, are primarily provided to form handles by which the container 60 may be lifted. However, the system of the present invention makes use of these openings 62C and 62D as indexing elements for orienting the container 60 at a predetermined angle about its vertical axes. The manner in which this is accomplished will become more fully apparent hereinafter with reference to the other figures of the drawings. Suffice it to say at this time, that each of the openings 62C and 62D have angular end walls oriented in, respectively, opposite directions which may be used as an indexing surface for the latch mechanism of the present invention. Either one of the openings 62C, 62D may be utilized as the indexing opening depending upon the direction of the rotation of the container 60. For example, when the container 60 is rotated in a counterclockwise direction opening 62C is used as the indexing opening and when the container is rotated in a clockwise direction opening 62D may be used as the indexing opening. In the automatic degasser station according to the present invention, the container 60 is rotated in a clockwise direction and, therefore, the opening 62D is used to index the valve 64B relative to the degassing socket.

Figure 2:
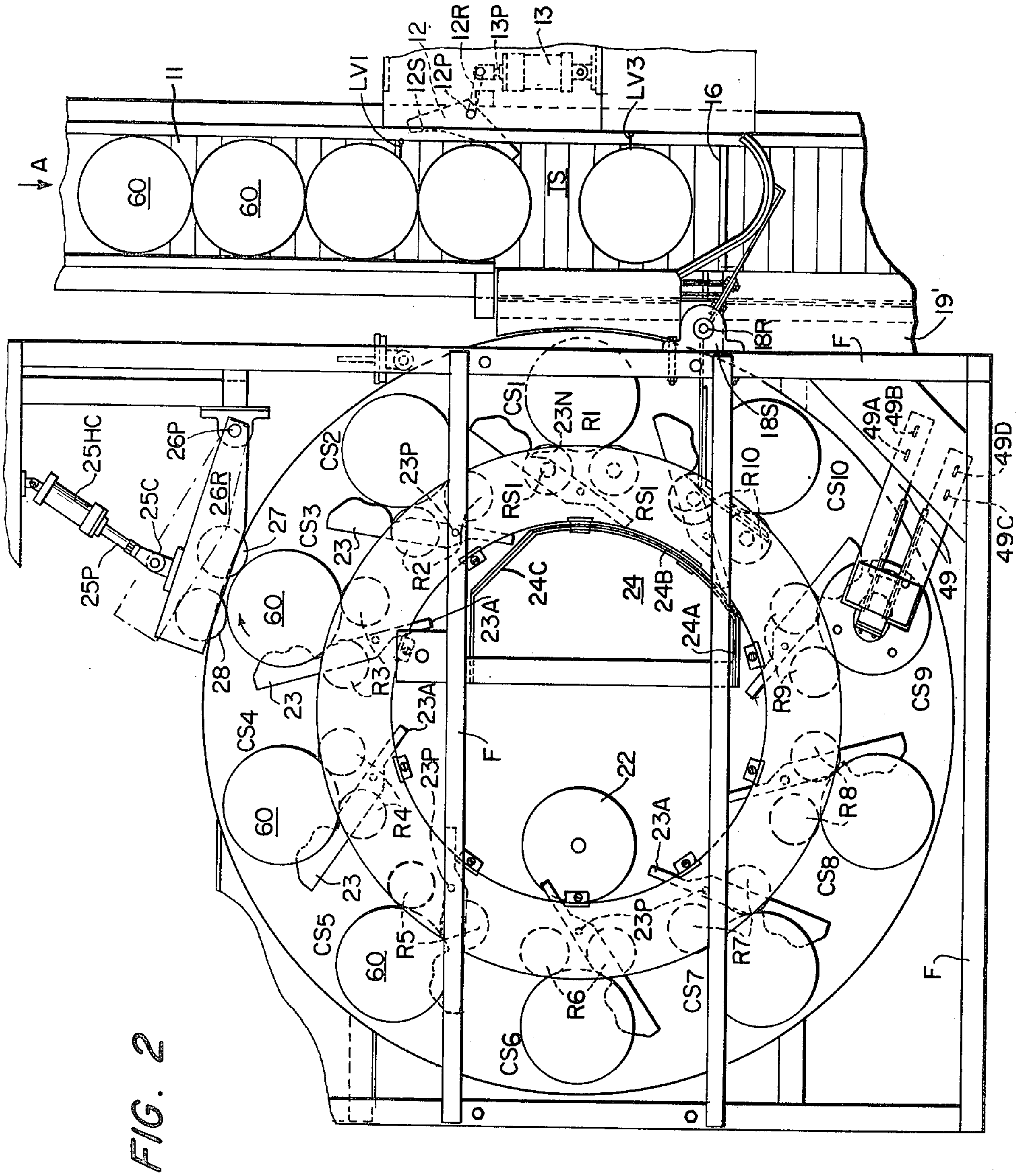
FIG. 2 is a top plan diagrammatic view of the automatic degasser station of the present invention which illustrates the operation of the automatic container indexing conveyor of the present invention.
Figure 3:
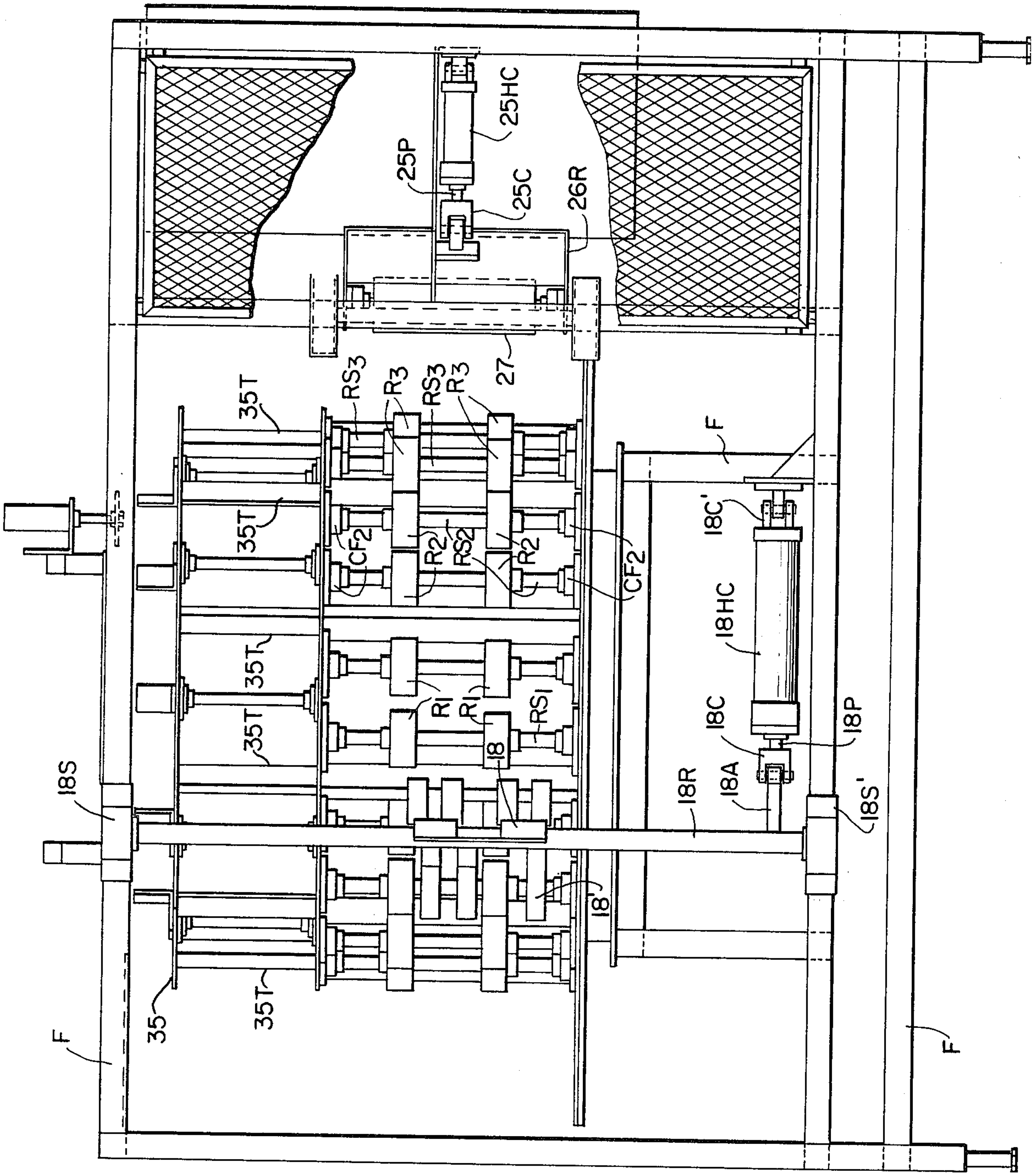
FIG. 3 is a side elevational view of the automatic degasser station of the present invention.

The apparatus of the present invention is generally illustrated in the top plan view and side elevational view of FIGS. 2 and 3. As illustrated in FIG. 2, a plurality of unprocessed containers 60 are positioned on a conveyor 11 and are moved in the direction of the arrow A to a stop mechanism 12. The stop mechanism 12 includes a curved surface 12S which engages the sidewall of a container 60 to hold the container at the stop station SS immediately before the transfer station TS. The stop mechanism 12 is pivoted around a pivot point 12P which is connected by means of a rod 12R to the outer end of a piston rod 13P. The piston rod 13P is operatively positioned within a pneumatic escapement cylinder 13 and upon actuation of the pneumatic escapement cylinder is reciprocated to permit one container 60 to pass from the stop station SS to the transfer station TS. A limit switch LV1 is positioned adjacent to the stop mechanism 12 to activate the pneumatic escapement cylinder 13 and the stop mechanism 12 when the system cycle is first initiated. Further, a stop bar 16 is provided immediately downstream of the transfer station TS to prevent a container 60 from inadvertently passing directly through the transfer station.

A container 60 entering the transfer station TS engages a suitably positioned limit switch LV3 which begins the system cycle in a manner to be fully described hereinafter. As illustrated in FIG. 3, transfer sweep arm 18 and a discharge sweep arm 18' are affixed to a rod 18R which is rotatably positioned within the support 18S. A rod 18R is rotatably supported in an upper support 18S and a lower support 18S' which are affixed to the framework F. The rod 18R includes an outwardly projecting arm 18A which is attached by a coupling 18C to a piston rod 18P. The piston rod 18P is operatively positioned within the pneumatic ON-OFF cylinder 18HC which is affixed to the framework F by means of a coupling 18C'. The sweep arms 18, 18' move containers 60 to and from a turntable 20 to be described.

As will be more fully apparent hereinafter the present invention provides a rotatable turntable 20 adjacent to the conveyor at the transfer station TS which includes ten stations. The turntable will be described in detail hereinafter with reference to FIG. 5.

As illustrated in FIG. 2, latch plate 23 is provided at each of the ten stations of the turntable 20. The primary purpose of the latch plate is to assist in indexing or positioning the containers at the third station of turntable 20, so that a predetermined valve 64B on the top of a container is aligned with a degassing socket 31. The latch plate 23 is normally biased inwardly and transversely of the container axis for indexing purposes to be more fully described hereinafter.

As illustrated in FIG. 2, the latch plate 23 is pivoted out of engagement with the container 60 when the container is positioned in both the tenth container station $CS_{10}$ and the first container station $CS_1$. The arm 23A of the latch plate 23 engages a cam surface 24 mounted on the stationary framework F to pivot the latch plate 23 about its pivot point 23P. The cam surface 24 includes a first portion 24A which engages with the arm 23A so that a smooth transition of the pivoting of the latch plate 23 about the pivot point 23P occurs just prior to the rotation of the arm 23A over a second portion of the cam surface 24B. It is the engagement of the arm 23A with the second cam surface 24B which moves the latch plate 23 out of engagement with the container 60 in both the tenth container station $CS_{10}$ and the first container station $CS_1$. A third portion 24C of the cam surface 24 enables a smooth transition of the latch plate 23 from the container 60 at the first container station $CS_1$ to allow spring-biased latch 23 to engage a container 60 at the second container station $CS_2$.

Figure 8A:
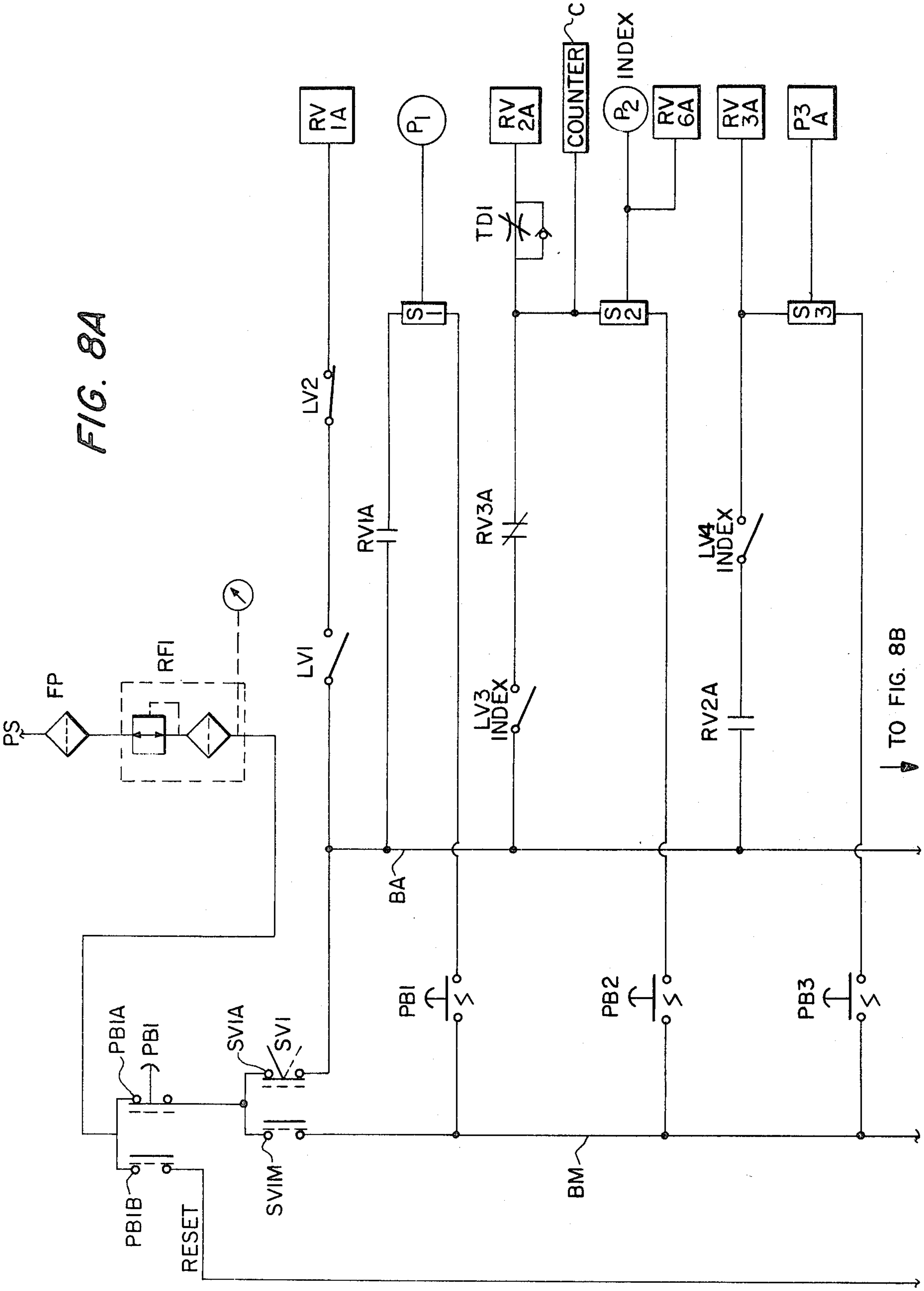
FIGS. 8A and 8B constitute a schematic circuit diagram of the control circuit utilized in the present invention for performing the synchronous operation of the component parts of the apparatus of the present invention.
Figure 8B:
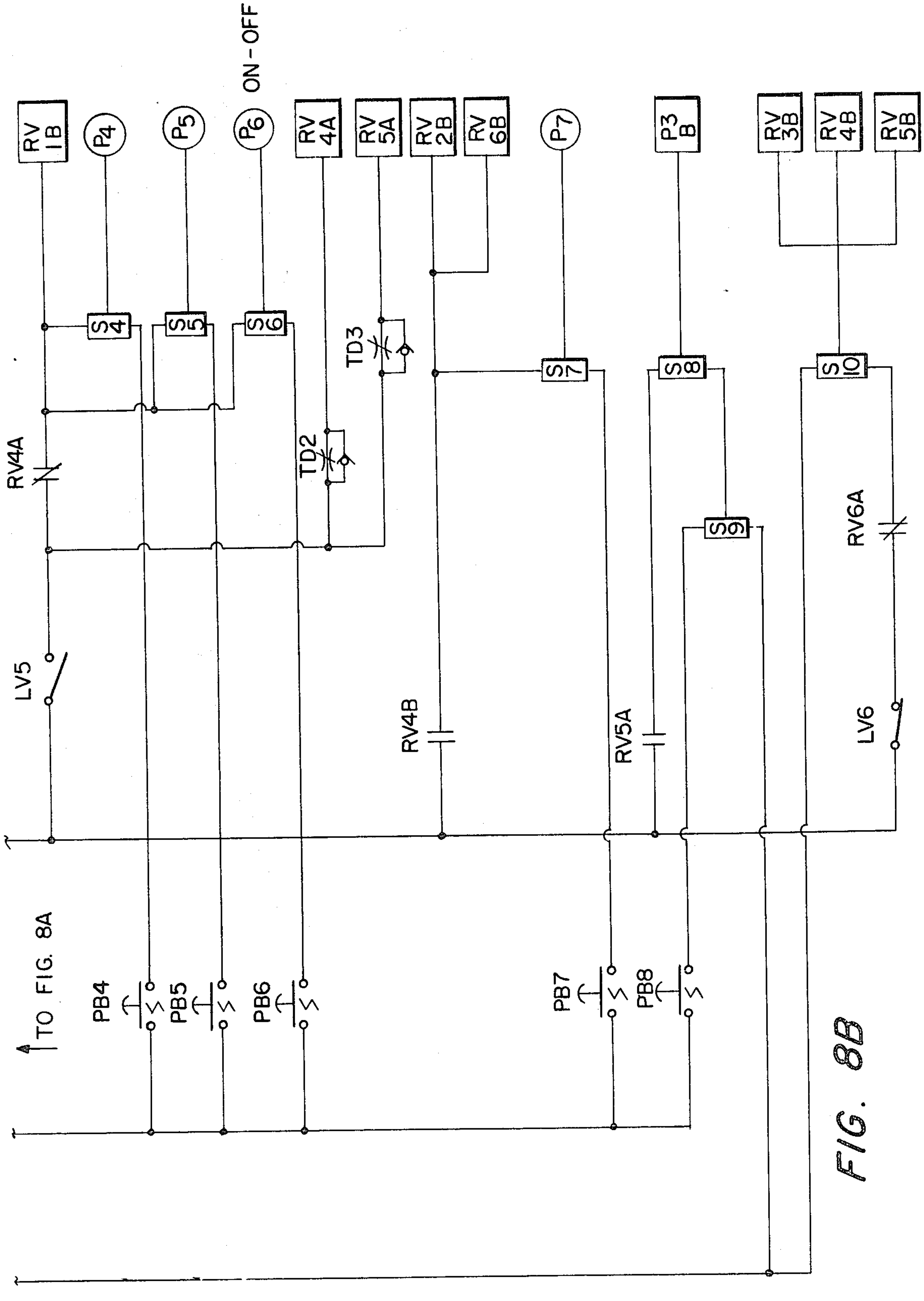
Figure 9:
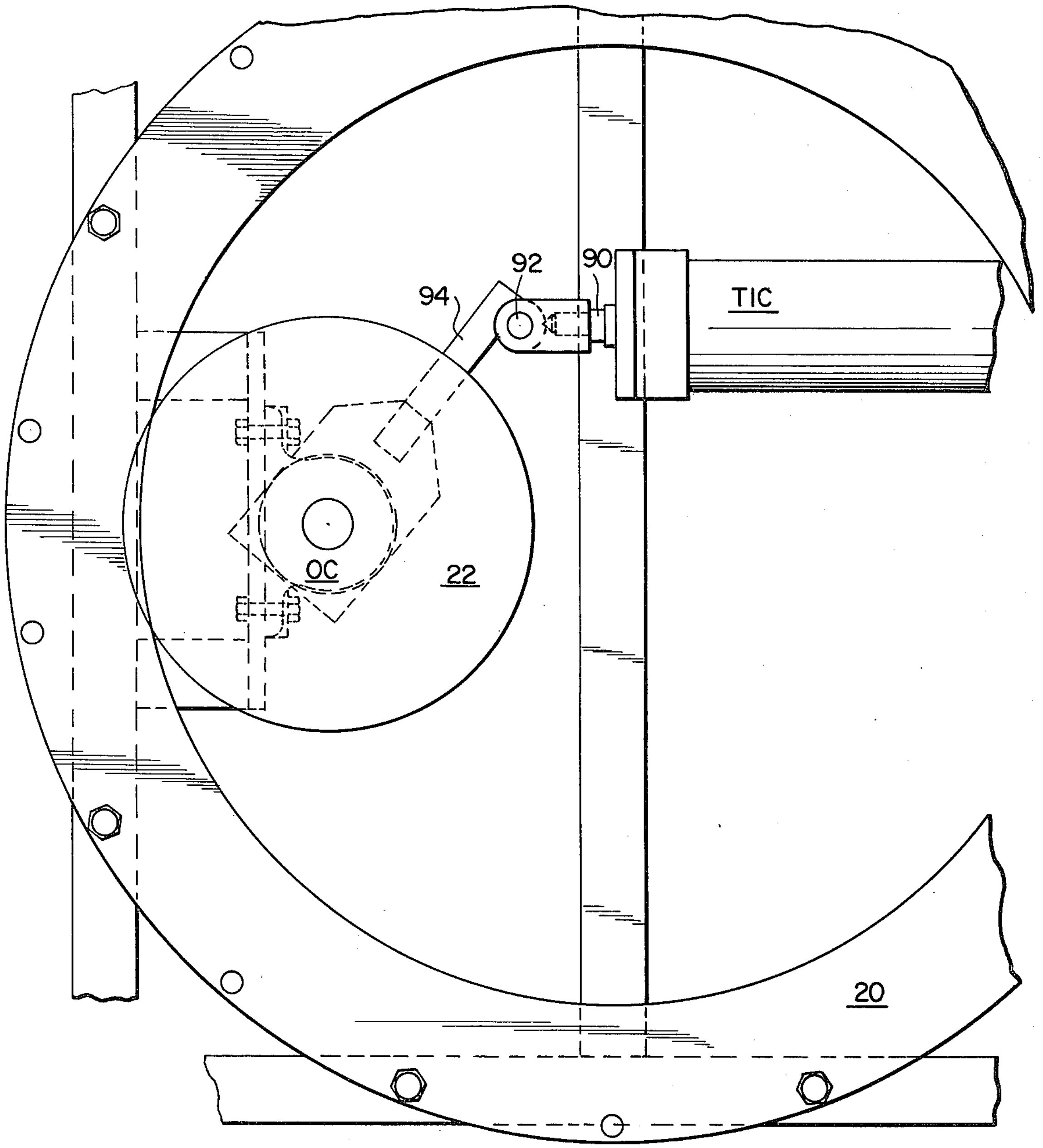
FIG. 9 is a diagrammatic illustration of the turntable indexing means of the present invention.

An indexing mechanism for the turntable 20 of the present invention is illustrated in detail in FIG. 9. A table indexing cylinder TIC is provided, which is pneumatically operated by the control circuit of FIGS. 8A and 8B in a manner to be described more fully hereinafter, upon the closing of limit switch LV3 by the presence of a container 60 at station TS of FIG. 3. Table indexing cylinder TIC includes a piston rod 90 extending from one end thereof and connected to a pivotable coupling member 92. Coupling member 92 is pivotally connected to one end of a lever arm 94, the other end of which is connected through an overrunning clutch OC to turntable drive pinion gear 22. Upon each actuation of cylinder TIC in response to the closing of limit switch LV3 piston rod 90 extends therefrom causing the turntable 20 to index approximately 36°. As table 20 rotates tab F (FIG. 5) on the bottom thereof initiates the activation of the clamping cylinder 25HC at the third station CS3 thereby reciprocating piston rod 25P to rotate support arm 26R about the pivot point 26P so that rollers 27, 28 are brought into engagement with the side walls of a container 60. Becuase of the overrunning clutch OC which temporarily disconnects the indexing drive train, the entire table 20 is in effect indexed by the combined action of the clamping mechanism on a container 60 at the third or clamping station CS3. In other words, cylinder TIC moves turntable 20 to approximately the right position and the clamping mechanism via a container 60 at station CS3 indexes the turntable 20 and other containers thereon in a final position for processing for each stopped position of table 20.

FIG. 2 clearly illustrates that the containers 60 throughout the indexing cycle around the turntable from the first container station $CS_1$ through the tenth container station $CS_{10}$ are in engagement with the backup rollers $R_1$-$R_{10}$. The backup rollers $R_1$-$R_{10}$ are positioned in pairs which are rotatably mounted on individual shafts $RS_1$-$RS_{10}$. These rollers act as guides during the rotation of the containers 60 at the third container station $CS_3$.

Figure 4:
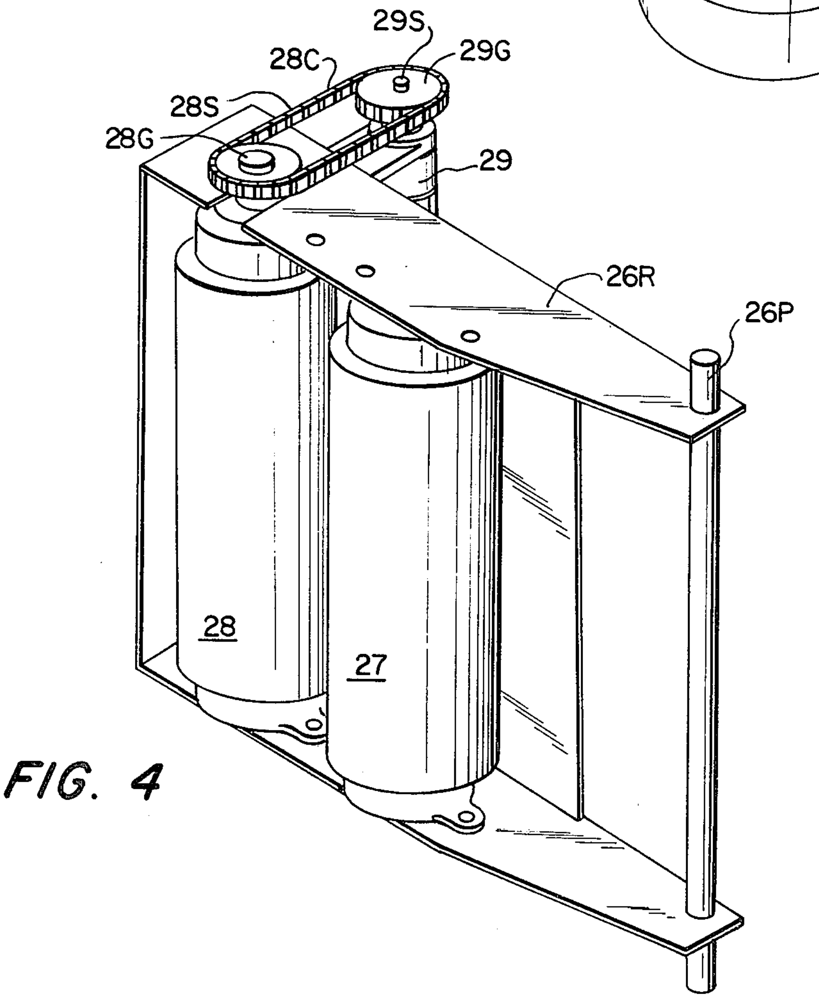
FIG. 4 is a perspective view illustrating the details of the drive rollers of the automatic positioning and clamping mechanism of the present invention.

Referring to FIG. 4, the rollers 27, 28 are mounted on a support arm 26R which is pivoted about the pivot rod 26P. The roller 28 is mounted on a shaft 28S and includes a gear 28G mounted at the outer extremity thereof. The gear 28G is operatively connected by means of a chain 28C to a gear 29G mounted on a shaft 29S which is rotatably driven by the motor 29. As the arm 26R is rotated from its dotted line position to the solid line position, as illustrated in FIG. 2, and the rollers 27, 28 are brought into engagement with the sidewall of the container 60. After a container 60 is fully clamped the motor 29 is activated to rotate the gear 29G thereby rotating the chain 28C, the gear 28G and the roller 28. The motor 29 is activated by the closing of a limit switch LV5 (FIG. 8B) suitably positioned on the clamp mechanism to rotate the container 60 in a clockwise direction to ensure that the notch 23N of the latch plate 23 is brought into engagement with the opening 62D, thereby properly indexing the valve 64B with respect to the degassing socket 31. After the notch 23N is properly positioned in the opening 62D the rotation of the container 60 is stopped and the driven roller 28 merely slips (or stalls) along the outer surface of the container 60 until a timer TD2, to be described hereinafter with respect to FIGS. 8A, 8B, deactivates the motor 29.

Figure 5:
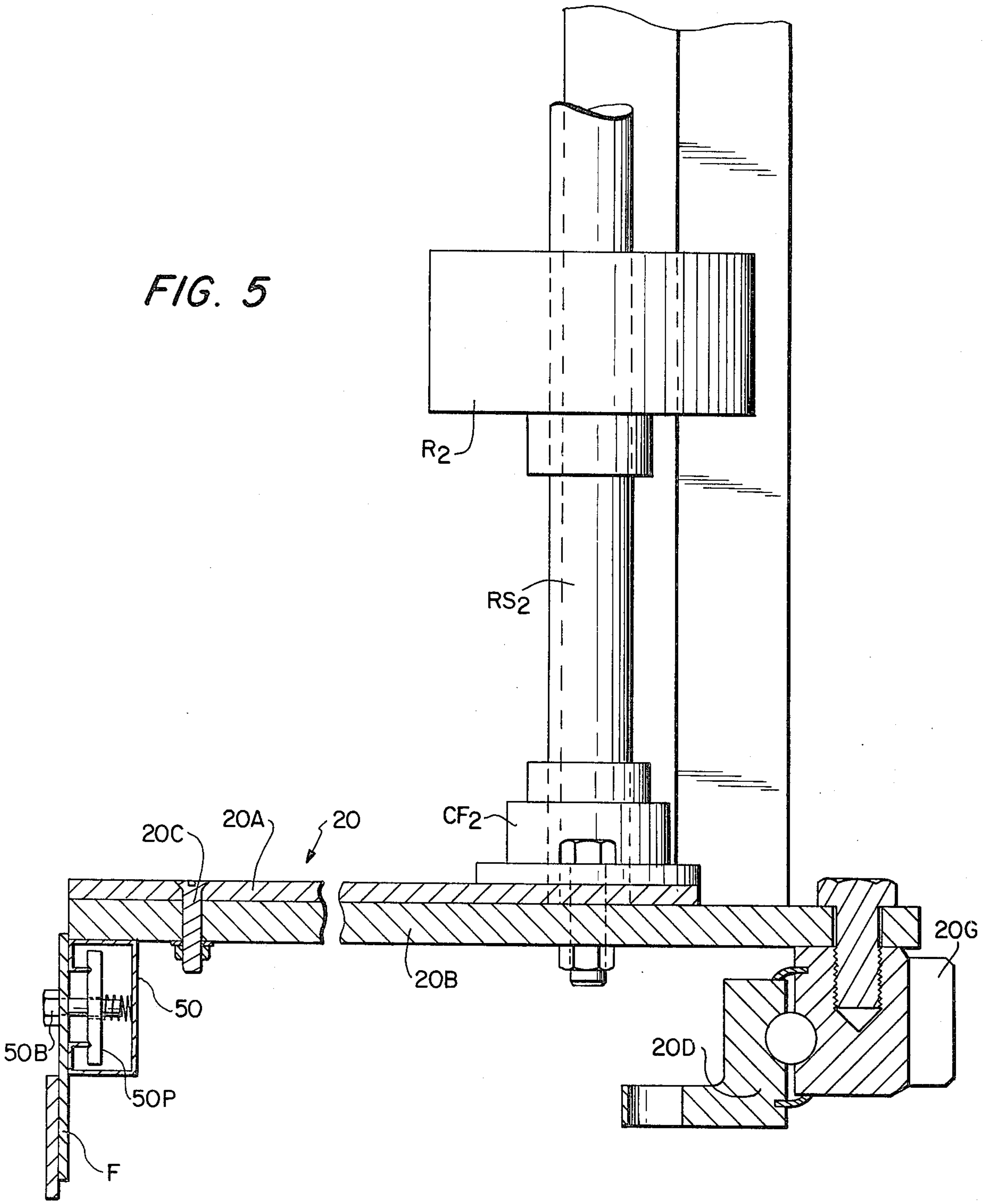
FIG. 5 is a cross-sectional view illustrating the turntable for the automatic degasser of the present invention.

A cross-sectional view of the turntable 20 for the automatic degasser of the present invention is illustrated in FIG. 5. The turntable 20 includes a bearing surface 20A on which containers 60 are supported constructed of plastic, TEFLON or other suitable material which will permit the bottom of the container 60 to freely rotate thereon when the container is positioned at the third container station $CS_3$. The bearing surface 20A is fixed to a rigid subframe 20B. On the bottom of subframe 20B are indexing tabs F which engage limit switch LV4 positioned on the table frame near station $CS_3$ to initiate the operation of clamping cylinder 25HC as turntable 20 rotates. Tabs F (one at each of the ten stations) are supported on adjustable brackets including channels 50, adjustment plate 50P, and adjustment bolt 50B.

As further illustrated in FIG. 5, the bearing surface 20A is affixed to the rigid subframe 20B by means of bolts 20C. Further the guide rollers $R_1$-$R_{10}$ of each of the container stations $CS_1$-$CS_{10}$ are affixed to the bearing surface 20A and the rigid subframe 20B by a connector frame means. For example, the guide rollers for container station $CS_2$ are attached to the turntable by means of a connecting bearing $CF_2$ which positions the rod $RS_2$. The connecting bearing $CF_2$ is suitably bolted to the turntable 20. A gear 20G is attached to the inner peripheral surface of the turntable and is in meshing engagement with a pinion gear 22. In addition, a turntable bearing member 20D is positioned adjacent the gear 20G and guides the rotation of the inner peripheral surface of the turntable.

Figure 6A:
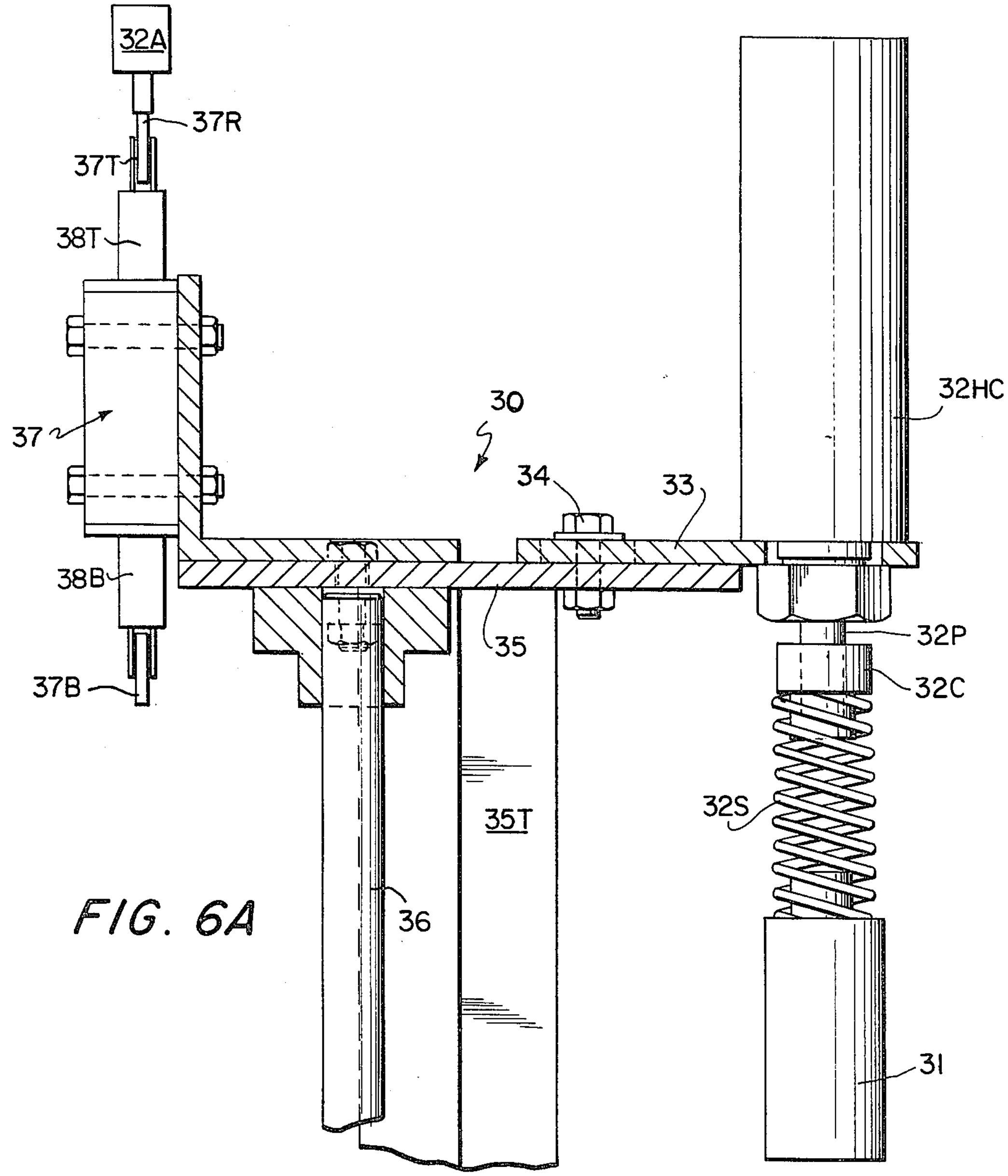
FIG. 6A is a partial cross-sectional view of a typical degassing assembly.

Referring to FIG. 6A, ten degassing assemblies 30 are affixed to the turntable 20, one at each container station, and rotate together with the turntable 20. During the rotation of the degassing assembly 30 from the third container station $CS_3$ through the ninth container station $CS_9$ the degasser pneumatic cylinder 32HC is activated to reciprocate the piston rod 32P downwardly thereby holding the degassing socket 31 in engagement with the valve 64B throughout this portion of the rotation of the turntable 20.

Figure 6B:
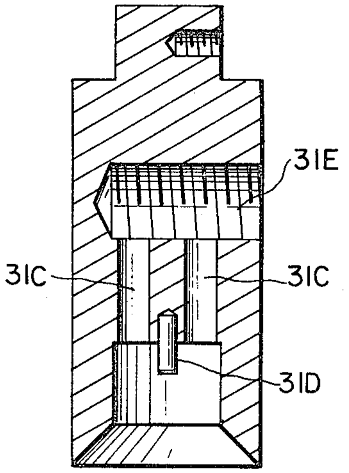
FIG. 6B is a cross-sectional view of a degassing plunger and further illustrating the valve depressor positioned therein.

As illustrated in FIGS. 6A, 6B the degasser socket pneumatic cylinder 32HC is mounted on a plate 33 which is adjustably mounted by attaching means 34 to a top plate 35. The top plate 35 is mounted on support tubes 35T which are affixed at the bottoms to the turntable 20. Also mounted on top plate 35 by a suitable bracket is an air valve 37. At the top end of valve 37 is a roller 37T coupled to a reciprocating plunger 38T which extends into valve 37 for switching the valve from one state to another. A similar plunger 38B and roller 37B are provided at the bottom of valve 37. When the top plunger 38T is depressed into valve 37, valve 37 opens supplying air to degassing socket cylinder 32HC and when plunger 38B is depressed into valve 37, valve 37 releases air from cylinder 32HC, thus retracting socket 31. The top plunger 38T is depressed by the action of the piston rod of degasser actuator cylinder 32A which is responsive to timer TD2 of FIGS. 8A, 8B to be described hereinafter. The bottom plunger 38B is pressed into valve 37 by the action of a ramp (not shown) located on the top surface of turntable 20 between stations $CS_9$ and $CS_{10}$. In other words as turntable 20 rotates roller 37B rides up over said ramp between stations $CS_9$ and $CS_{10}$, switches the state of valve 37, and causes cylinder 32HC to retract socket 31. The bars 36 in FIG. 6A pivotally supported the latches 23 of FIG. 2.

The piston rod 32P includes a coupling member 32C mounted at the outer end thereof. A spring 32S is mounted to the coupling member 32C at one end thereof and is attached to the upper end of the degassing socket 31 at the other end thereof. The spring 32S is designed to enable the degassing socket 31 to properly mate with the valve 64B even though the two elements may be slightly out of alignment with each other. Nevertheless, when the degasser socket pneumatic cylinder 32HC is activated via valve 37 thereby reciprocating the piston rod 32P downwardly and engaging the degassing socket 31 with the valve 64B and the spring 32S is compressed, the force of the compressed spring 32S together with the downward movement of the piston 32P ensures that the valve depresser 31D engages the valve stem within the valve 64B to depressurize the container 60. The gases exhausted from the container 60 pass upwardly through the vertical channels 31C and are exhausted through the horizontal exhaust channel 31E.

As the container 60 is indexed from the third container station $CS_3$ to the ninth container station $CS_9$ the degassing socket 31 is held in engagement with the valve 64B to depressurize the container. At the ninth container $CS_9$ the closure member 66 is automatically opened inwardly by means of a handle lifting assembly 40.

Figure 7A:
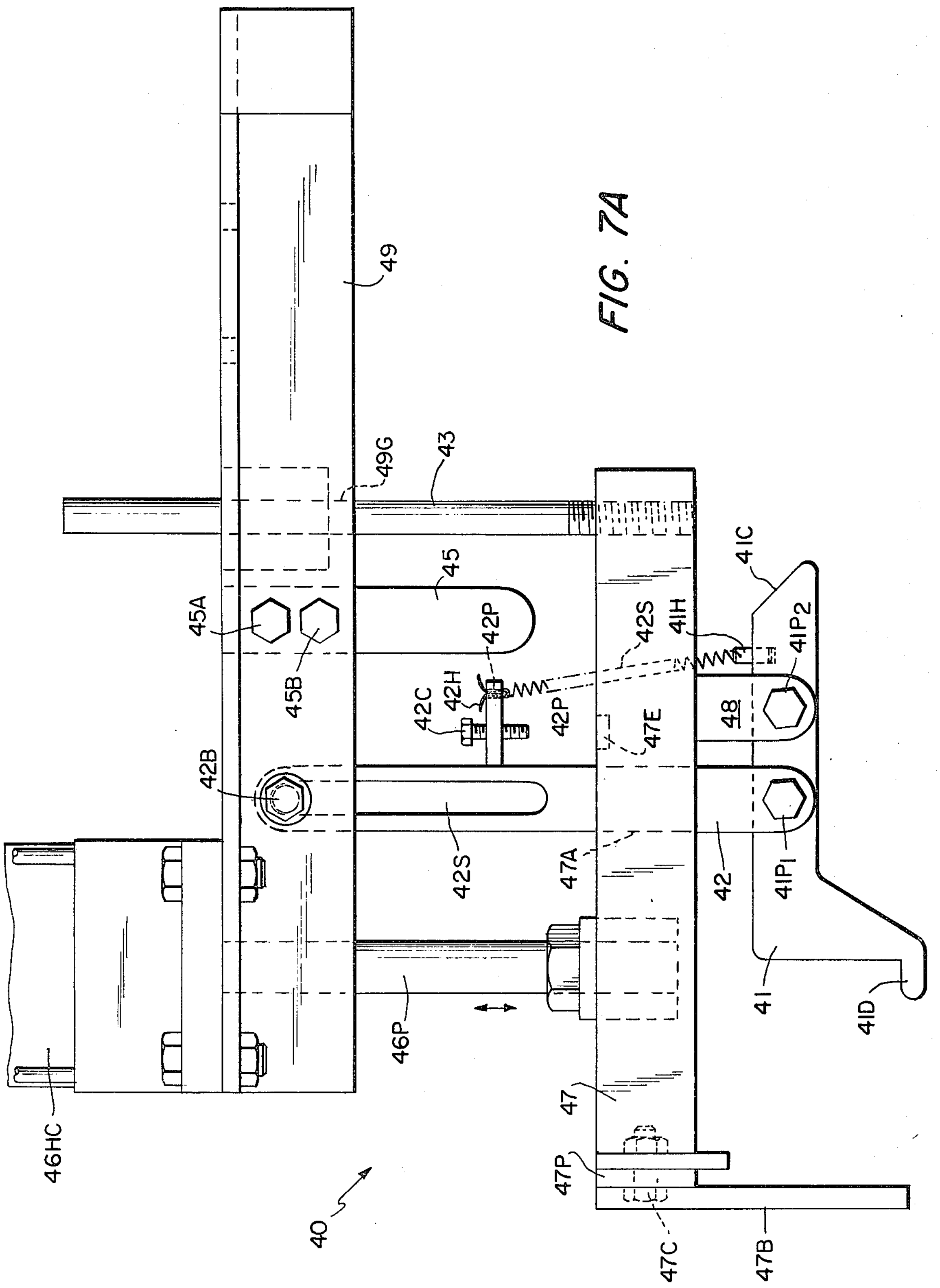
FIG. 7A is a perspective view illustrating the details of the handle lifting assembly of the automatic degasser according to the present invention.
Figure 7B:
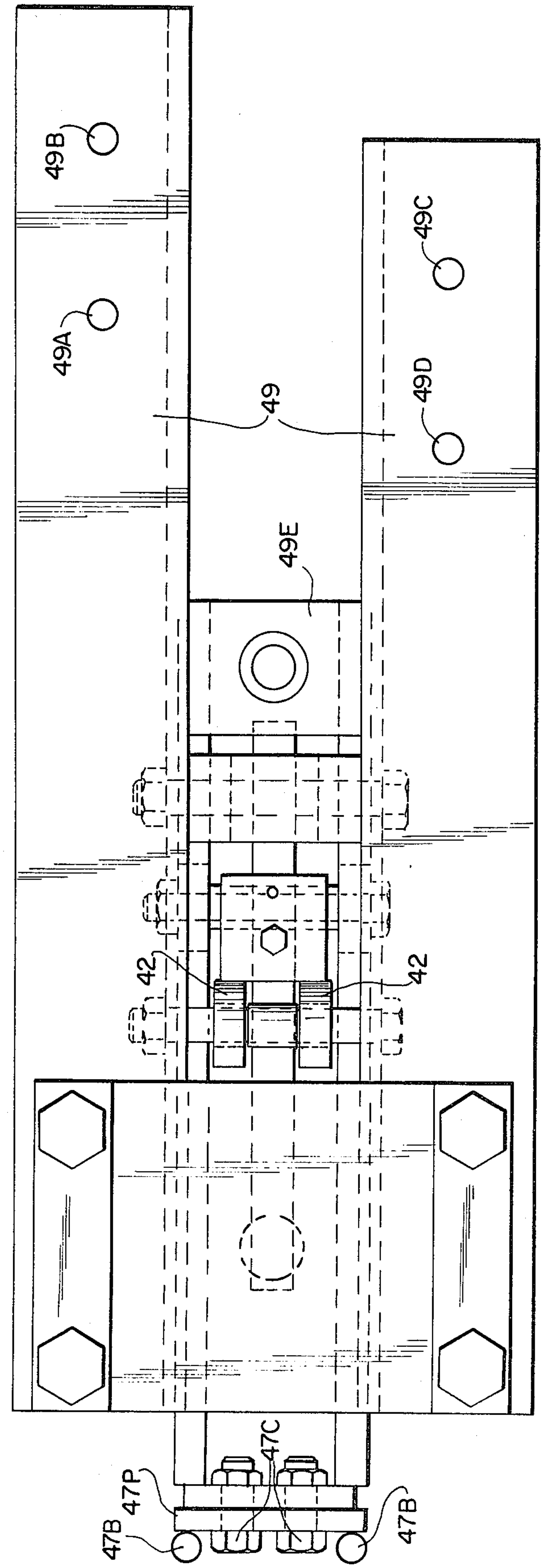
FIG. 7B is a top plan view of the handle lifting assembly as illustrated in FIG. 7A.

As illustrated in FIGS. 7A, 7B, the handle lifting assembly 40 includes a handle hook 41 which is pivoted about two pivot pins 41$P_1$, 41$P_2$. The pivot pin 41$P_1$ connects the handle hook 41 by means of connecting rods 42 to the attaching arm 49. These connecting rods 42 include a guide slot 42S which slidably reciprocates on the attaching bolt 42B projecting through the attaching arms 49. Further, the attaching arms 49 are connected by bolts positioned through the holes 49A–49D to the framework F of the automatic degasser assembly adjacent to the ninth container station $CS_9$.

The lid lift pneumatic cylinder 46HC includes a piston rod 46P operatively positioned therein. The outer end of the piston rod 46P is connected to two spaced actuating arms 47 which define an opening 47A therebetween through which the connecting rods 42 are slidably supported. In addition, a second pair of connecting rods 48 are firmly affixed at one end thereof to the respective actuating arms 47 and include openings therethrough which receive the second pivot pin 41$P_2$ for pivotally connecting the outer end of the handle hook 41.

Two rods 37B are positioned at one end of the actuating arms 47. These rods are mounted on a plate 47P which is bolted to the actuating arms 47 by means of bolts 47C. The two rods 47B work in conjunction with the handle hook 41 to open the closure member 66 of the container 60.

A guide bar 43 is positioned at the other end of the actuating arm 47 which is slidably received within an opening 49G positioned in a plate member 49E disposed between the two attaching arms 49. Further, a stop member 45 is bolted to the attaching arms 49 by means of the bolts 45A, 45B which position the stop member 45 between the two attaching arms 49.

The connecting rods 42 are connected together by a plate 42P mounted on the upper half of the connecting rods. The plate 42P includes an opening 42P' which is threaded to receive a bolt 42C. The bolt 42C is designed to mate in the opening 47E in the actuating arm 47 when the piston rod 46P and therefor the actuating arm 47 are in their retracted position. Further, the plate 42P includes a second opening 42P' through which a pin 42H is mounted to hold one end of the spring 42S thereto. As illustrated in FIG. 7A, the other end of the spring 42S is attached to a pin 41H which is affixed to the handle hook 41.

Initially, the piston rod 46P is in its retracted position wherein the actuating rod 47 is moved upwardly so that a cam surface 41C of the handle hook 41 is in abutment with the stop member 45 and the lower end of the bolt 42C abuts in the opening 47E of the actuating arm 47. In this position the connecting rods 42 are moved upwardly and a substantial portion of the guide slot 42S is positioned above the attaching bolt 42B. In addition, the handle hook 41 is inclined downwardly so that the hook portion 41D projects towards the handle 68 of a container 60. When the pneumatic cylinder 46HC is actuated to move the piston rod 46P downwardly responsive to the closing of a limit switch LV5 (FIGS. 8A, 8C), the downward movement of the piston rod 46P causes a corresponding downward movement of the actuating arm 47. As the cam surface 41C of the handle hook 41 disengages from the stop member 45 the spring 42S pivots the handle hook 41 about the second pivot point 41$P_2$. This counterclockwise rotation of the handle hook 41 positions the hook portion 41D in the position necessary to engage the curved handle 68 of a container 60.

As illustrated in FIG. 7A, the continued downward movement of the piston rod 46P eventually causes the guide slot 42S of the connecting rods 42 to bottom out on the attaching bolt 42B. In this position the handle hook 41 tends to rotate clockwise about the pivot point 41$P_1$ past a substantially horizontal position wherein the hook portion 41D is positioned under the curved handle 68 and lifts said handle hook to open closure member 66. After a time delay the lid lift pneumatic cylinder 46HC is actuated to retract the piston rod 46P. The rods 47B ensure the positioning of the hook portion 41D relative to the handle 68 and assure that the closure member 66 is opened inwardly into the container 60 as the handle hook 41 is moved upwardly.

After the handle lifting assembly 40 has opened the closure member 66 the container 60 is indexed on the turntable 20 towards the tenth container station $CS_{10}$. As illustrated in FIG. 2, as the container 60 moves from the ninth container station $CS_9$ to the tenth container station $CS_{10}$ the arm 23A of the latch plate 23 engages the first portion 24A of the cam surface 24 to rotate the latch plate 23 about the pivot point 23P thereby disengaging the notch 23N from the opening 62D.

A preferred embodiment of a pneumatic control system suitable for operating the apparatus of FIGS. 2 to 7 is illustrated in FIGS. 8A and 8B. There is illustrated a main pneumatic power supply PS with a filter regulator RF1 coupled to a pushbutton power switch PB1 having terminals PB1A and PB1B. Terminals PB1B are coupled to a reset line to be described further hereinafter and terminals PB1A are in series with an automatic/manual selector switch SV1. Selector switch SV1 has terminals SV1A and SV1M which are coupled to main power lines BA and BM, respectively.

Bus line BM has coupled thereto a plurality of parallel branches including manual pushbutton switches PB1 and PB8 which are provided to facilitate manual actuation of any separate function, or portion, of the overall operating cycle of the apparatus of the present invention as will be described more fully hereinafter. Power bus line BA coupled to the automatic mode slide SV1A of selector switch SV1 communicates with a plurality of parallel branches including suitable switches, relays, time delays, etc. which control the synchronous operation of the apparatus of the present invention.

These respective parallel branches may best be described from top to bottom as viewed in FIGS. 8A, 8B. Beginning at the top of FIG. 8 a first parallel branch coupled to bus line BA includes in series a limit switch LV1, limit switch LV2 and relay RV1A.

The next parallel branch includes relay contacts RV1A coupled to one terminal of a shuttle valve S1. The opposite terminal of shuttle valve S1 is coupled to one terminal of pushbutton switch PB1. Shuttle valve S1 has an output P1 which is applied to the escapement cylinder illustrated in FIG. 2.

The next parallel branch includes a limit switch LV3 connected in series to normally closed relay contacts RV3A, variable time delay means TD1 and relay RV2A. Coupled to a junction between relay contacts RV3A and time delay TD1 is a counter C which monitors the number of containers processed by the apparatus. Coupled to the same junction between relay contacts RV3A and time delay device TD1 is one terminal of a shuttle valve S2 having an opposite terminal coupled to pushbutton switch PB2. The output of shuttle valve S2 applies a pressure P2 to an indexing cylinder which indexes turntable 20 and to relay RV6A.

The next parallel branch includes relay contacts RV2A which are normally open in series with index switch LV4 and relay RV3A. A shuttle valve S3 has one terminal coupled to the junction between index switch LV4 and relay RV3A and an opposite terminal coupled to one side of pushbutton switch PB3. The output of shuttle valve S3 applies pressure P3A to clamping cylinder 25HC the container clamping mechanism at station 3 of turntable 20.

The next parallel branch includes a series connection of limit switch LV5, normally closed relay contacts RV4A and relay RV1B. The junction between relay contacts RV4A and relay RV1B is coupled to one terminal of a shuttle valve S4 the opposite terminal of which is coupled to manual pushbuton switch PB4. The output of shuttle valve S4 applies a pressure P4 to the cam rotating motor 29 described hereinbefore with reference to FIGS. 2 and 4. Also coupled to the junction between normally closed relay contacts RV4A and relay RV1B is one terminal of a shuttle valve S5, the opposite terminal of which is coupled to manual pushbutton switch PB5. The output of shuttle valve S5 applies a pressure P5 to the lid lift pneumatic cylinder 46HC which raises and lowers the handle lifting mechanism 40 as described hereinbefore with reference to FIG. 7A. Also connected to the common junction between relay contacts RV4A and relay RV1B is one terminal of a shuttle valve S6 which has its opposite terminal coupled to manual pushbutton switch PB6. The output of shuttle valve S6 applies a pressure P6 to the ON-OFF cylinder 18HC which actuates the sweep arms 18, 18' described hereinbefore with reference to FIGS. 2 and 3. Coupled to the junction between limit switch LV5 and relay contacts RV4A is a series circuit consisting of time delay element TD2 and relay RV4A and in parallel therewith is another series circuit consisting of variable time delay element TD3 and relay RV5A.

The next parallel branch coupled to main bus BA includes a series combination of a relay terminal RV4B and a relay RV2B. A relay RV6B is coupled to the common junction between relay terminals RV4B and relay RV2B. Coupled to the same common junction is one terminal of a shuttle valve S7 which is connected at its opposite terminal to manual pushbutton switch PB7. The output of shuttle switch S7 applies a pressure P7 to degassing cylinder 32HC, described hereinbefore with refernce to FIG. 6A for raising and lowering the degassing socket 31 onto the valve 64B on the top of the FIGAL container.

Another parallel branch coupled to bus line BA includes normally open relay contacts RV4A and shuttle valve S8 coupled thereto. One terminal of shuttle valve S8 is coupled to the output of a shuttle valve S9 which has one terminal coupled to manual pushbutton switch PB8 and its opposite terminal coupled to the reset line which leads back to terminals PB1B of pushbutton switch PB1. The output of shuttle valve S8 applies a pressure P3B to clamping cylinder 32HC coupled to the clamping mechanism of the present invention to retract the clamping mechanism.

The last parallel branch coupled to the bus line BA includes a series combination of the limit switch LV6, normally closed relay contact RV6A and one terminal of shuttle valve S10. The opposite terminal of shuttle valve S10 is coupled to the reset line with terminal PB1B of pushbutton switch PB1. The output of shuttle valve S10 applies pneumatic pressure to relays RV3B, RV4B and RV5B which reset the control circuit.

Thus, all of the pneumatic circuit connections illustrated in FIGS. 8A, 8B which enable the selective application of pneumatic pressure to the escapement cylinder 13, the turntable indexing cylinder, the clamp cylinder 25HC, the cam rotating motor 29, the lid lift cylinder 46HC, the ON-OFF cylinder 18HC, and the degassing cylinder 32HC, have been described.

DESCRIPTION OF OPERATION

The operation of the system of the present invention can now be illustrated with reference to the control circuit of FIGS. 8A, 8B in conjunction with the apparatus illustrated in FIG. 2. The system is ready for operation when the main air supply PS is turned ON; the control air via switch SV1A is connected to bus line BA; the escapement cylinder 13 is retracted; the clamping mechanism at station $CS_3$ is unclamped; the turntable index cylinder TIC is retracted; pneumatic can rotating motor 29 is deenergized; the handle lifting mechanism is retracted; the ON-OFF cylinder 18HC is retracted; the degasser cylinders 32A and 32HC are retracted; and the main conveyor is running with a series of FIGAL containers thereon.

The automatic indexing, degassing and opening operations performed by the apparatus of the present invention are now ready to begin.

The operator first actuates the selector switch SV1 to the automatic position SV1A indicated in FIG. 8A coupling the pneumatic power supply PS to bus line BA. Pushbutton PBL is then pushed to the position indicated in FIG. 8 completing the pneumatic circuit. The first container 60 of a series of containers moving along the conveyor closes limit switch LV1 which energizes relay RV1A through series connected normally closed switch LV2. LV2 is closed when sweep arm 18 is fully retracted. Upon the energization of relay RV1A relay contacts RV1A close thus applying pneumatic pressure P1 through shuttle valve P1 to the escapement cylinder 13 to permit entry of the first container 60 into the region of the turntable. As container 60 enters the region of the turntable it closes limit switch LV3 which immediately applies pneumatic power through normally closed relay contacts RV3A and shuttle valve S2 in the form of a pressure P2 to the turntable indexing cylinder which rotates the turntable 36° or one position. Simultaneously, relay RV6A is actuated and counter C registers one count. Time delay means TD1 begins its timing cycle preparatory to actuation of relay RV2A. Timer TD1 prevents premature shifting of relay contacts RV2A to delay closing of the circuit including LV4 to preclude clamping the same container twice. As the index cylinder TIC extends stepping the turntable 20, limit switch LV4 is closed by a suitable positioning tab (F, FIG. 5) on the bottom of the turntable 20, energizing relay RV3A and applying pneumatic pressure P3A through shuttle valve S3 to the clamp cylinder 25HC of the clamping mechanism described hereinbefore. At this time normally closed relay contacts RV3A are open thus removing power from the turntable indexing cylinder TIC. When the clamping mechanism including the two pairs of rollers is fully clamped on the container 60, a limit switch LV5, suitably positioned with respect to the clamping mechanism at station 3, is closed which immediately applies power through normally closed relay contact RV4V to relay RV1B and, shuttle valves S4, S5 and S6. This in turn applies pneumatic pressure P4, P5, P6 to the can rotating motor 29, the lid lift pneumatic cylinder 32C and the ON-OFF cylinder 18HC which actuates the sweep arms 18, 18′ to move one container on and one container off the turntable 20. Thus, the container at station $CS_3$ rotates until it is indexed in a position aligned with the degassing socket 31, the handle lift mechanism extends into contact with the handle 41 on top of the container 60, the escapement cylinder retracts 13, and the timing cycles of timers TD2 and TD3 are initiated to control the timed actuation of relays RV4A and RV5A, respectivly. When timer TD2 times out, the can rotation motor 29 stops, the degasser cylinders 32A and 32HC extend, the lid lift cylinder 46HC retracts, and the ON-OFF cylinder 18HC coupled to the sweep arms 18, 18′ retracts. When timer TD3 times out, relay RV5A is actuated closing relay contact RV5A, applying pressure P3B through shuttle valve S8 to unclamp the clamping mechanism by retraction of the clamp cylinder 25 HC. When the clamp mechanism is fully unclamped an appropriate limit switch LV6 closes applying pneumatic power through normally closed relay contacts RV6A, shuttle valve S10 to relays RV3B, RV4B, RV5B, thus, resetting the entire circuit.

As described hereinbefore, there are also provided manual actuating means for operating each portion of the apparatus of the present invention separately and independently from the other portions by manually depressing pushbuttons PB1 to PB8. The manual operation of these pushbuttons and how they effect the various components of the system of the present invention should be readily apparent from the above description of the automatic operation of those components.

It should be understood that the system described herein may be modified as would occur to one of ordinary skill in the art without departing from the spirit and scope of the present invention.

What is claimed is:

1. An apparatus for automatically degassing containers through a valve disposed in the top thereof as said containers pass along a first conveyor means into a predetermined area, said containers having index openings of a predetermined characteristic shape and openable lid in the top thereof, comprising:

second conveyor means disposed in said predetermined area;

sensing means for detecting the entrance of a container into a region adjacent said second conveyor means;

transfer means for transferring said container from said region onto said second conveyor means;

indexing means responsive to said sensing means for driving said second conveyor means;

positioning means adjacent said second conveyor means for clamping said container on said second conveyor means and for rotating said container about its vertical axis;

latch means for stopping the rotation of said container by said positioning means at a position wherein said valve on top of said container has a predetermined orientation;

degassing means for operatively engaging said valve to permit the flow of gas within said container therethrough to thereby degas said container;

means for moving said degassing means into engagement with said valve when said latch means stops the rotation of said container; and means for automatically opening a lid on the top of said container after the container has been degassed.

2. The apparatus according to claim 1, wherein said second conveyor means is a rotatable turntable having a plurality of container supporting stations thereon.

3. The apparatus according to claim 1, wherein said positioning means comprises:

first roller means disposed on one side of said containers;

second roller means disposed on the opposite side of said containers; and actuator means for moving either of said roller means toward the other roller means to clamp said container therebetween.

4. The apparatus according to claim 3, wherein said first roller means includes a pair of rollers, one of said pair being power driven, and said second roller means includes a pair of rollers which are not power driven but which are free to rotate with said container.

5. The apparatus of claims 3 or 4, wherein said first roller means is mounted on a lever and said actuator means comprises a pneumatic cylinder for pivoting said lever.

6. The apparatus according to claim 1, wherein said latch means comprises a lever which rides along the periphery of said container until it reaches said index opening, said lever having a notch which locks in said index opening.

7. The apparatus according to claim 1, wherein said degasser means includes a socket for receiving said valve.

8. The apparatus of claim 7, wherein said socket is mounted on resilient support means which permits limited movement of said socket with respect to said valve.

9. The apparatus according to claim 3 or 4 wherein said second conveyor means comprises a turntable having a plurality of container supporting stations, each of said stations including said second roller means and wherein said first roller means is disposed adjacent said turntable at only one of said stations.

10. The apparatus according to claim 2 further including a latch means at each of said stations.

11. The apparatus according to claim 2 including a degasser means at each of said stations.

12. The apparatus of claim 2 wherein said indexing means is a step drive means which steps said containers seriatim through each of said stations, said step drive means including a clutch means which disconnects said drive while said positioning means clamps a said container.

* * * * *